United States Patent [19]
Merritt

[11] Patent Number: 5,688,126
[45] Date of Patent: Nov. 18, 1997

[54] ARITHMETIC GAME

[76] Inventor: Matthew W. Merritt, P.O. Box 1534, Gatlinburg, Tenn. 37738

[21] Appl. No.: 582,275

[22] Filed: Jan. 3, 1996

[51] Int. Cl.$^6$ .......................... G09B 19/22; G09B 19/02; A63F 3/00

[52] U.S. Cl. .................. 434/128; 434/191; 434/209; 273/243; 273/248; 273/146

[58] Field of Search ..................... 434/188, 191, 434/209, 128, 205; 273/146, 242, 243, 248, 256, 258, 268, 271, 272, 299

[56] References Cited

U.S. PATENT DOCUMENTS

| | | |
|---|---|---|
| 1,163,125 | 12/1915 | Bechmann . |
| 1,403,989 | 1/1922 | Verneau . |
| 2,502,238 | 2/1950 | Wade et al. . |
| 2,585,458 | 2/1952 | Gordon . |
| 2,714,261 | 8/1955 | Hight . |
| 2,871,581 | 2/1959 | Guzak ............................ 434/209 |
| 2,901,839 | 9/1959 | Huff . |
| 3,659,851 | 5/1972 | Lang et al. ...................... 434/191 |
| 4,114,290 | 9/1978 | Cooper ........................... 434/200 |
| 4,480,836 | 11/1984 | Regis ............................. 273/248 |
| 5,083,793 | 1/1992 | Sanford .......................... 273/249 |
| 5,273,430 | 12/1993 | Strychewski .................... 434/128 |
| 5,421,732 | 6/1995 | Taylor ............................ 434/195 |

*Primary Examiner*—Robert A. Hafer
*Assistant Examiner*—Laura Fossum
*Attorney, Agent, or Firm*—Luedeka, Neely & Graham, P.C.

[57] ABSTRACT

An arithmetic game for teaching students basic mathematical skills includes a playing board, four dice, and a complement of playing pieces, or markers. Indicia disposed on the boards and dice determine whether and where a player may place a marker on the board. Board indicia includes numerals two-dimensionally arranged to form a mathematical table. Indicia disposed on the dice includes numerals and mathematical functions. Results are mathematically calculated by a player from the various two numeral combinations presented by the dice. The player evaluates the results to assess the strategic significance of each, and a marker is placed at a position on the mathematical table corresponding to the chosen result. The first player to connect his or her markers from one side of the mathematical table to the other side wins.

10 Claims, 4 Drawing Sheets

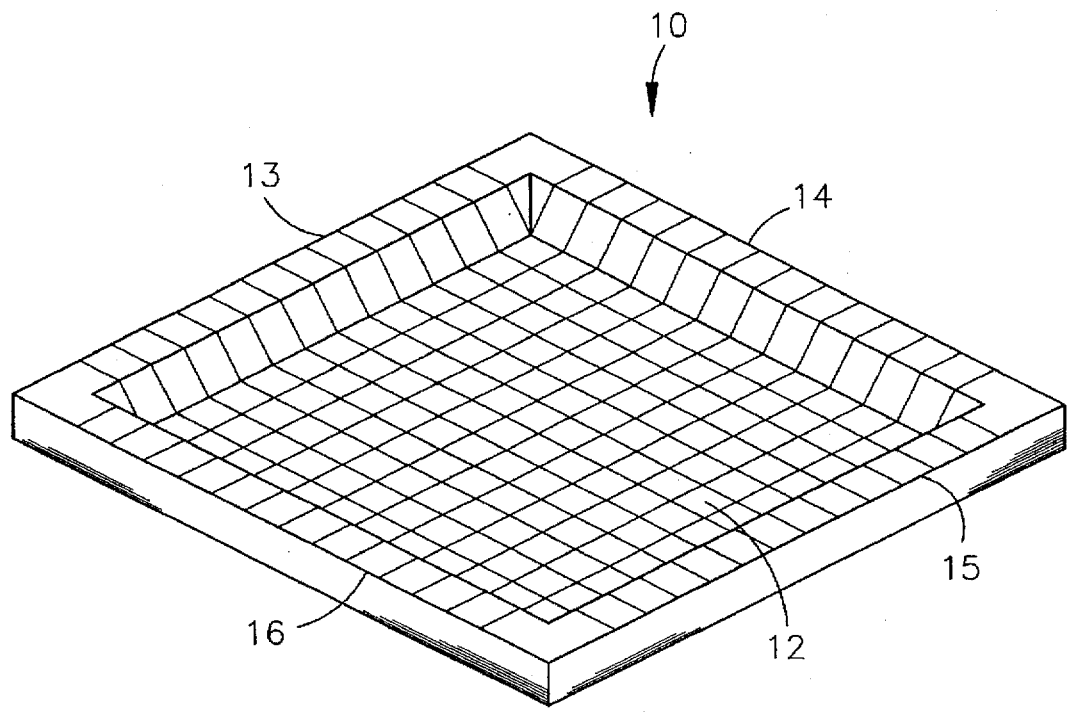
Fig. 1A
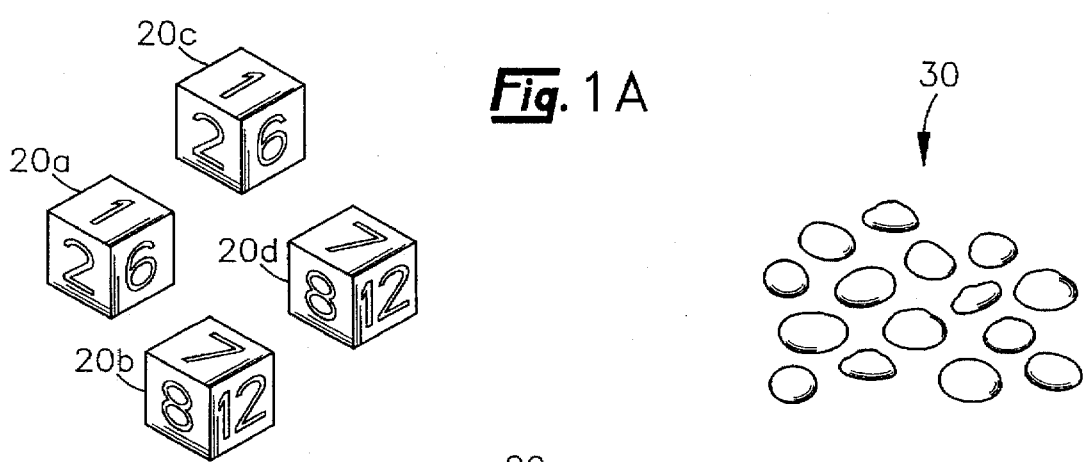
Fig. 1B
Fig. 1C
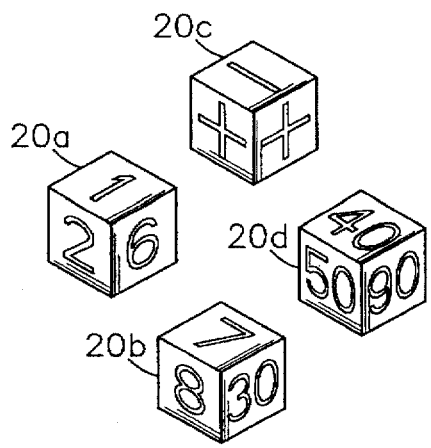
Fig. 1D

| | 1 | 2 | 3 | 4 | 5 | 6 | 7 | 8 | 9 | 10 | 11 | 12 |
|---|---|---|---|---|---|---|---|---|---|---|---|---|
| 1 | 1 | 2 | 3 | 4 | 5 | 6 | 7 | 8 | 9 | 10 | 11 | 12 |
| 2 | 2 | 4 | 6 | 8 | 10 | 12 | 14 | 16 | 18 | 20 | 22 | 24 |
| 3 | 3 | 6 | 9 | 12 | 15 | 18 | 21 | 24 | 27 | 30 | 33 | 36 |
| 4 | 4 | 8 | 12 | 16 | 20 | 24 | 28 | 32 | 36 | 40 | 44 | 48 |
| 5 | 5 | 10 | 15 | 20 | 25 | 30 | 35 | 40 | 45 | 50 | 55 | 60 |
| 6 | 6 | 12 | 18 | 24 | 30 | 36 | 42 | 48 | 54 | 60 | 66 | 72 |
| 7 | 7 | 14 | 21 | 28 | 35 | 42 | 49 | 56 | 63 | 70 | 77 | 84 |
| 8 | 8 | 16 | 24 | 32 | 40 | 48 | 56 | 64 | 72 | 80 | 88 | 96 |
| 9 | 9 | 18 | 27 | 36 | 45 | 54 | 63 | 72 | 81 | 90 | 99 | 108 |
| 10 | 10 | 20 | 30 | 40 | 50 | 60 | 70 | 80 | 90 | 100 | 110 | 120 |
| 11 | 11 | 22 | 33 | 44 | 55 | 66 | 77 | 88 | 99 | 110 | 121 | 132 |
| 12 | 12 | 24 | 36 | 48 | 60 | 72 | 84 | 96 | 108 | 120 | 132 | 144 |

Fig. 2

ARITHMETIC GAME

TECHNICAL FIELD

The present invention relates generally to a game for teaching children and others basic mathematical calculations. More particularly, the invention relates to an arithmetic game that employs a game board having arithmetic indicia, a plurality of dice for arithmetically determining a player's move on the board, and a complement of markers for indicating a player's move.

BACKGROUND OF THE INVENTION

Children are taught at early ages the rigors of basic mathematical calculations, including addition, subtraction, and multiplication. These basic mathematical skills must be learned and even memorized before more advanced mathematical operations, such as algebra and trigonometry, can be learned. In other words, the rudimentary mathematical operations of addition, subtraction, and multiplication are the building blocks for future learning of more advanced mathematical techniques.

Unfortunately, the attention span of most children (and sometimes adults) is short, necessitating educational measures that will capture the student's attention and direct his or her energies toward the cognitive tasks of learning elementary mathematics. Such educational measures should strive to make learning fun and simple by providing the student with an incentive for learning—qualities that are sorely lacking in some of the more traditional methods of teaching rudimentary mathematics. Such an incentive to learn can be provided by incorporating basic mathematical calculations into a game so that in order to win the game, the student must be able to add, subtract, and multiply. The incentive to learn therefore becomes as strong as the incentive to win the game. By making mathematics challenging in such an interesting and recreational way, the child (or adult) will acquire basic mathematical skills in a minimum amount of time with maximum retention. In such a setting, what was once seemingly complex to the student soon becomes simple.

A number of attempts have been made in the prior art to provide educational devices and games for teaching basic arithmetic. One such device is provided in U.S. Pat. No. 2,901,839 to D'Alan E. Huff. Huff discloses an educational device for teaching elementary mathematics, such as multiplication tables. The device includes a plurality of cards with each card having a main number and a multiplication sign. Each card has a key symbol, such as a multiplication sign, and a column of numbers to be multiplied, divided, etc. by the main number. A pair of dice are rolled to present a mathematical problem for solution. The numbers one die match the main numbers on the cards and the numbers on the other die match the column of numbers on the cards. A main number is selected from one die and another number is selected from the other die and the resulting combination is matched with a corresponding combination of numbers on the cards to produce a result. Since the device of Huff is not a game, there is no incentive to win and therefore, a lack of incentive to acquire the mathematical skills necessary to win. Other educational devices for teaching basic mathematical skills include those disclosed by U.S. Pat. No. 2,714,261 to Hight, U.S. Pat. No. 2,502,238 to Wade et al., and U.S. Pat. No. 1,163,125 to Bechmann.

One attempt to provide an arithmetical game for teaching elementary mathematics is disclosed by U.S. Pat. No. 1,403,989 to Verneau. The arithmetical game of Verneau consists of a rectangular board divided from left to right and top to bottom with an equal number of spaces in horizontal and vertical rows. The top horizontal row and left vertical row are distinguished by color and the respective divisions thereof are numbered to designate the places for the application of the correspondingly colored and numbered playing pieces constituting the multiplicands and multipliers. The other divisions of the board are inscribed with numbers designating the respective products resulting from the multiplication of the several multiplicands and multipliers, and on the proper spaces so marked and in rectangular relation to the multiplicands and multipliers the correspondingly numbered and distinguished products playing pieces are placed. All of the playing pieces are randomly assigned to the players and the first player to get rid of all of that player's pieces is the winner. Since the playing pieces are simply placed on their corresponding numbers on the board, the game could be played to completion with the winning player never actually performing an arithmetic operation.

U.S. Pat. No. 2,585,458 to Gordon discloses a game apparatus for teaching the use of the multiplication table. The game employs a board with a centrally marked, conventional multiplication table with the top and left side rows marked with factor numerals and the various product numerals aligned with their corresponding factor numerals. Twelve annular rings, or playing pieces, are inscribed with the respective factor numerals 1 through 12. The game is played much like Tiddly Winks™ in that the playing pieces are "snapped" onto the playing field. Points are scored by snapping a playing piece onto the board so that it encircles a corresponding product numeral. Arguably, this game focuses the player's attention more on the physical skill of accurately snapping the playing pieces onto the board than on the cognitive skill of performing basic mathematical calculations.

Therefore, what is needed is an arithmetic game that recreationally teaches and encourages students, particularly children, the basic mathematical skills of addition, subtraction, and multiplication. The arithmetic game should require each player to perform basic mathematical calculations in order to win.

SUMMARY OF THE INVENTION

In a preferred embodiment, the present invention provides an arithmetic game including a board having a playing surface and board indicia disposed on the board. The board indicia defines a plurality of unique regions on the board where each region is different from the other regions. A plurality of subregions are defined within each of the unique regions by the board indicia. A plurality of dice are provided with, each dice having a plurality of faces. Dice indicia in the form of numerals and mathematical functions are disposed on the faces of the dice to define at least three unique combinations of any two of the dice. Each of the three unique combinations of dice correspond to two or less of the unique regions of the board, and each unique combination of two dice correspond with two or less of the subregions in the unique regions corresponding to the unique two dice combination. A plurality of markers are used by the players to indicate the subregions on the board.

The board indicia of the arithmetic game may further include a table of numerals arranged two-dimensionally in rows and columns where each of the numerals correspond to a unique one of the subregions. In one embodiment, the table of numerals is a multiplication table for playing a multiplication game. In another embodiment, the table of numerals is an addition/subtraction table for playing an addition/subtraction game.

In another preferred embodiment of the invention, an arithmetic game includes a board having inscribed thereon a table of numerals arranged two-dimensionally in rows and columns. A plurality of dice are inscribed with mathematical indicia, including numerals, such that the range of mathematical combinations permitted by a subset of the dice corresponds to a range of numerals inscribed on the board. A plurality of markers are used to indicate numerals on the board that are mathematically produced from a subset of the dice.

The table of the arithmetic game may further include four quadrants of numerals and the plurality of dice may include four dice. In this embodiment, the indicia inscribed on two of the dice represent multiplicands and the indicia inscribed on two of the dice represent multipliers so that all mathematical combinations resulting from a multiplication of any multiplier with any multiplicand results in a numeral corresponding to no more than two quadrants on the board.

The plurality of dice may include four dice with the indicia inscribed on three of the dice (numeral dice) representing numerals. The indicia inscribed on the remaining dice (function dice) represents the mathematical functions of addition and subtraction. With the dice so configured, the mathematical combinations resulting from addition or subtraction of numerals inscribed on two or more of the numbered dice results in a numeral that corresponds to a numeral inscribed on the board.

Also provided by the present game invention is a method of playing an arithmetic game having a playing board with a two-dimensional, mathematical table of numerals inscribed thereon. In this method, a plurality of dice having mathematical indicia disposed thereon, including numerals, are rolled to produce a plurality of rolled indicium. A result is mathematically calculated from two or more of the rolled indicium, and a marker is placed on a numeral on the board corresponding to the result.

The step of rolling a plurality of dice may further include rolling four dice. In one embodiment, two of the dice bear indicia representing multipliers and two of the dice bear indicia representing multiplicands. The result is calculated by multiplying a multiplier and a multiplicand. In another embodiment, three of the four dice include indicia representing numerals and the other dice includes indicia representing the mathematical functions of addition and subtraction. In this embodiment, the result is calculated by adding or subtracting two or more of the numerals.

BRIEF DESCRIPTION OF THE DRAWINGS

The invention will now be described in further detail with reference to the drawings wherein like reference characters designate like or similar elements throughout the several drawings as follows:

FIG. 1A is a perspective view of a game board having raised edges and a mathematical table;

FIG. 1B is an isometric view of four dice for playing the game with each dice having six sides;

FIG. 1C is an illustration of playing pieces used for marking a players selection on the mathematical table;

FIG. 1D shows dice with numerals and mathematical functions;

FIG. 2 is a front plan view of a multiplication table disposed on the game board of FIG. 1A;

DETAILED DESCRIPTION OF THE PREFERRED EMBODIMENT

Figure 3:
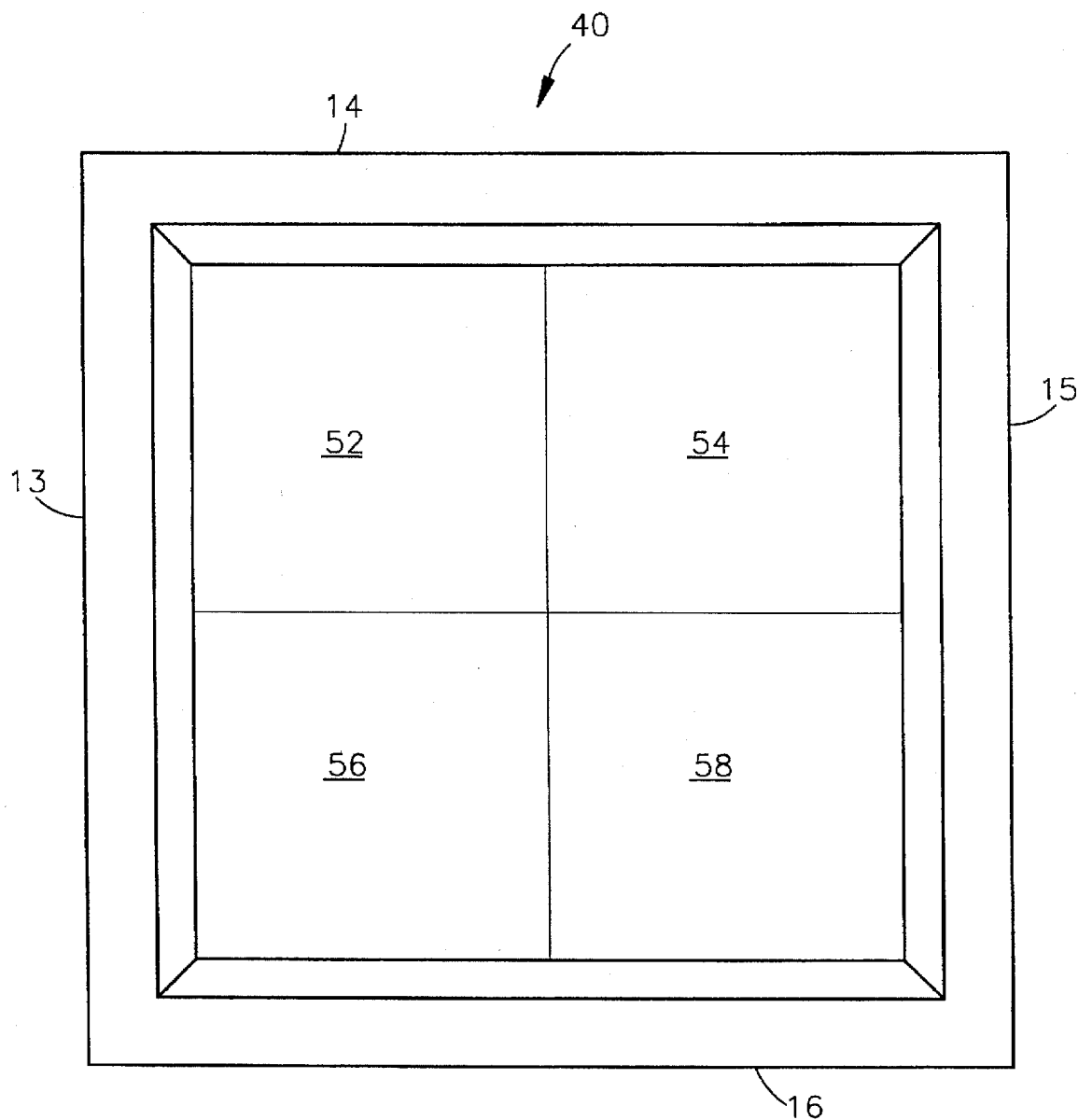
FIG. 3 is a front plan view of the multiplication table of FIG. 2 divided into quadrants.

The present invention provides an arithmetic game for teaching and encouraging students, particularly children, the basic mathematical skills of addition, subtraction, and multiplication. In a preferred embodiment as shown in FIGS. 1A–C, the game consists of a playing board 10 having raised edges 13, 14, 15, and 16, four multi-sided dice 20a, 20b, 20c, and 20d, and a complement of playing pieces, or markers 30. The board 10 includes indicia (not shown) in the form of numerals arranged two-dimensionally in horizontal rows and vertical columns to form a mathematical table, shown generally at 12, while the dice 20a–d include indicia in the form of numerals only, for one preferred embodiment shown in FIG. 18. For another preferred embodiment shown in FIG. 1D, the dice 20a–d, include both numerals and mathematical operations such as addition and subtraction. Although FIG. 1B illustrates six-sided dice, it will be understood that all configurations of multi-sided dice may be used. The markers 30, which in a preferred embodiment are colored glass beads with each player possessing a different color of beads, can be any object suitable for indicating and distinguishing a player's move on the board 10.

The numerals disposed on the table 12 and the indicia disposed on the sides of the dice 20a–d are selected to complement one another so that the mathematical combination of a single numeral selected from one side of one dice 20a–d and a single numeral selected from one side of another dice 20a–d will produce a result appearing in the table 12, although not all mathematical combinations need to appear in the table 12. For example, suppose that dice 20a included the numeral "4" on one of its sides and that dice 20b included the numeral "5" on one of its sides. In a multiplication game, the result of this combination of indicia is "20" which appears in the table 12. In an addition/subtraction game, the result of an addition of the "4" and "5" indicia is "9", which likewise appears in the table 12. However, the result of a subtraction of the numeral "5" from the numeral "4" is "−1", which in a preferred embodiment does not appear in the table 12. Since a minimum of two numerals are required to perform the mathematical operations of addition, subtraction, and multiplication, a preferred embodiment of the game requires that two numerals be selected from two of the dice 20a–d. However, the game may be played by mathematically combining more than two numerals, so long as the indicia disposed on the table 12 complement such numerical combinations.

Up to four persons may play the game with each player starting from a separate raised edge of the table 12. For example, one player may start from edge 13, another from edge 14, a third player from edge 15, and a fourth player from edge 16. The object of the game is for each player to march an imaginary army (as represented by the player's markers 30) across the board 12 from the player's starting edge to the opposite edge by linking markers 30 horizontally, vertically, or diagonally. For each player, the game is played by rolling the dice 20a–d and calculating a mathematical result from two numerals appearing on any two of the dice 20a–d. The player then places a marker 30 at the position in the table 12 where the chosen result appears. The first player to march his or her army across the board 10 by linking only that player's markers 30 is the winner.

It should be noted that the four dice 20a–d provide the player with several possible two-numeral mathematical results from which to choose. Thus, a player must be able to mathematically calculate at least one result from two of the dice 20a–d in order to place a marker 30 on the board 12. Usually, some of the mathematical results presented by the dice 20a–b will allow the player to place a marker 30 in a more strategic location of the board 12 than other results will allow. Thus, it is of significant strategic benefit for a player to be able to accurately and efficiently calculate the various mathematical results presented by the dice 20a–d. Therefore, a player's motivation to win encourages the player to develop the mathematical skills necessary to win.

Shown in FIG. 2 is a multiplication table 40 for playing a multiplication game. The top row 42 represents factor numerals, or multiplicands, and includes the numerals "1" through "12" appearing in ascending order from left to right. The leftmost vertical column 44 also represents factor numerals, or multipliers, and includes the numerals "1" through "12" appearing in ascending order from top to bottom. The products resulting from multiplication of each multiplicand 42 with each multiplier 44 are aligned with the respective factors within a products field 46. Although the table 40 of FIG. 2 includes twelve rows and twelve columns for a total of 144 positions within the products field 46, it will be understood that a multiplication table 40 of any dimension consistent with results that can be produced by the dice 20a–d can be used to play the game.

For the multiplication table 40 of FIG. 2, two of the four dice 20a–d bear the numerals "1", "2", "3", "4", "5" and "6". The remaining two dice bear the numerals "7", "8", "9", "10", "11", and "12". Any product resulting from the multiplication of any single numeral on one dice with any single numeral on another dice will appear at two positions within the table 40 if the multiplied numerals (factors) are different from one another, and if the multiplied numerals are the same the resulting product will appear at only one position within the table 40. For example, two times three equals six, and three times two equals six. Therefore, the product "6" appears at two positions corresponding to the factors "2" and "3" within the table The factors "3" and "3" align at only one position within the products field 46 so that the resulting product of "9" will appear only once for those factors. Each unique combination of two dice, therefore, presents a player with two or less possible positions within the products field 46 in which to place a marker 30.

Each unique combination of two dice also allows a player to place a marker 30 within two or less unique regions of the products field 46. To illustrate this aspect of how the indicia interrelates with the physical structure of the game, FIG. 3 depicts the multiplication table 40 of FIG. 2 without numerals or grid lines. The table 40 of FIG. 3 is divided into four quadrants: upper left hand quadrant 52, upper right hand quadrant 54, lower left hand quadrant 56, and lower right hand quadrant 58. All two numeral combinations resulting from the two dice inscribed with the numerals "1" through "6" allow a player to position a marker 30 only within quadrant 52 of the products field 46. All two numeral combinations resulting from a dice inscribed with the numerals "1" through "6" and a dice inscribed with the numerals "7" through "12" allow a player to position a marker 30 only within quadrants 54 and 56. Finally, all two numeral combinations resulting from the two dice inscribed with the numerals "7" through "12" allow a player to position a marker 30 only within quadrant 58. Thus, three unique combinations of two dice 20a–d are provided for a multiplication game, with each unique combination of two dice 20a–d allowing a player to position a marker 30 at two or less positions within two or less of the quadrants 52–58.

Figure 4:
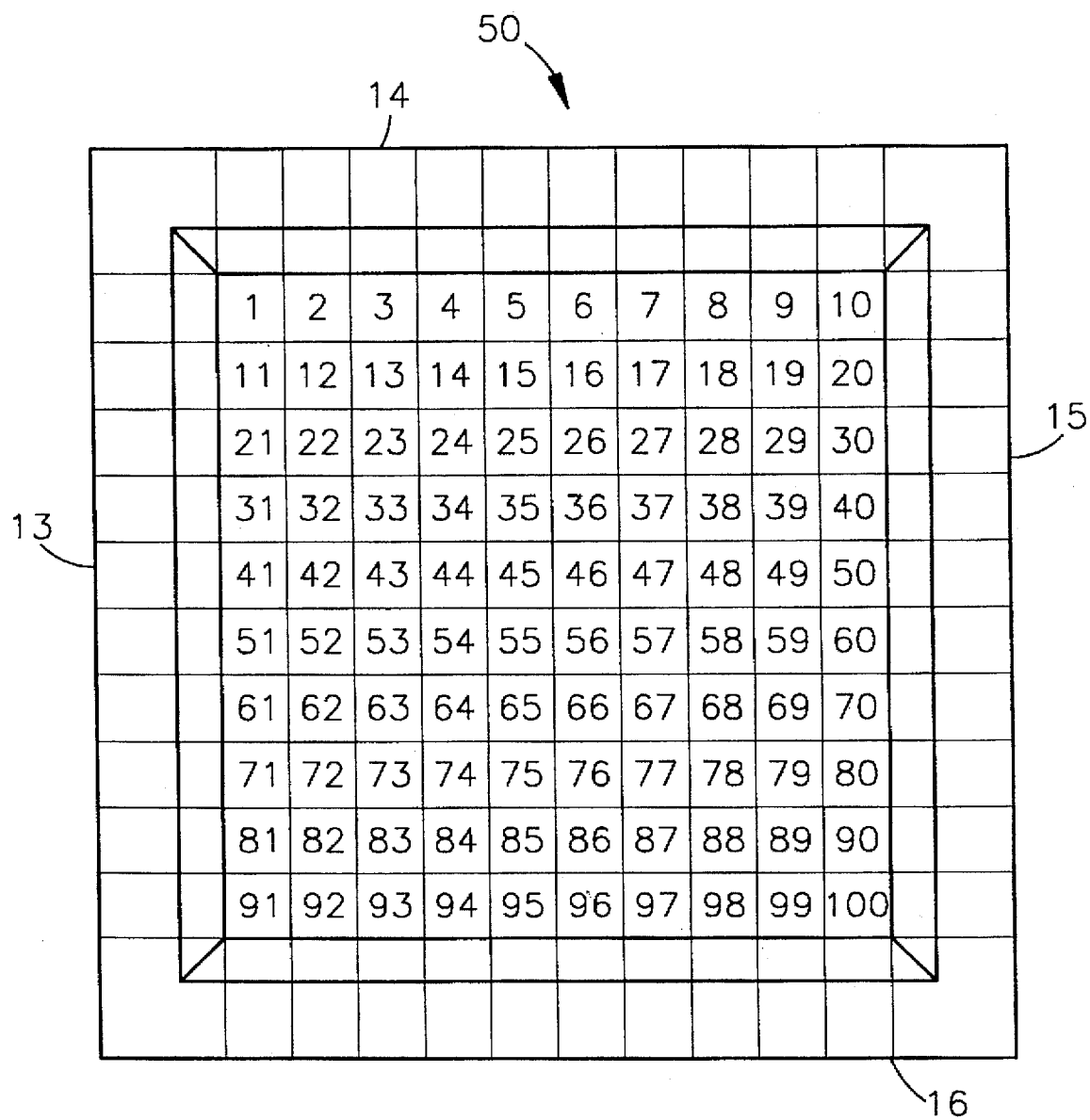
FIG. 4 is a front plan view of an addition/subtraction table disposed on the game board of FIG. 1A.

To play an addition/subtraction game, the numerals of the table 12 (FIG. 1) are selected to match mathematical combinations of numerals on the dice 20a–d. As shown in FIG. 4, the addition/subtraction table 50 in a preferred embodiment includes ten rows and ten columns of 100 positions, with each position bearing indicia in the form of numerals. The numerals of the table 50 range from "1" to "100" with the numeral "1" appearing at the row one, column one position and increasing from left to right, row by row with the numeral "100" appearing at the row ten, column ten position.

As with the multiplication game, the addition/subtraction game preferably uses four dice 20a–d, three of which bear only numerals (numeral dice) and one of which bears only the mathematical function signs for addition and subtraction (i.e., "+" and "−"). One of the numeral dice 20a–d bears the numerals "1", "2", "3", "4", "5", and "6". Another of the numeral dice 20a–d bears the numerals "7", "8", "9", "20", "20", and "30". A third numeral dice 20a–d bears the numerals "40", "50", "60", "70", "80", and "90". The fourth dice 20a–d (function dice) serves to determine whether numerals on the three numerals dice 20a–d are to be added or subtracted. The function dice bears three addition signs "+" and three subtraction signs "−"

To play the addition/subtraction game, a player rolls the four dice 20a–d to produce three numerals and a mathematical function, the mathematical function being either addition (+) or subtraction (1) as determined by the function dice. The player then selects two numerals from the numeral dice and either adds or subtracts the two numerals in accordance with the selected function sign presented by the function dice. The resulting sum or difference is then compared to numerals appearing within the table 50. If the sum or difference is between "1" and "100" inclusive and there is no other marker 30 at the position where the sum or difference appears, the player may place a marker 30 at that position. Since the table 50 does not contain all of the sums and differences that are possible with the dice 20a–d, the player must be able to determine whether the mathematical combination of any two of the three numerals presented by the dice 20a–d will enable the player to place a marker 30 at a position within the table 50. As with the multiplication game, players of the addition/subtraction game are motivated to learn the basic mathematical skills of addition and subtraction by their desire to win.

Each unique combination of two numeral dice 20a–d allows a player to place a marker 30 within a unique region of the addition/subtraction table 50. For example, all two numeral combinations that can result from the numeral dice inscribed with the numerals "1" through "6" and the numeral dice inscribed with the numerals "7", "8", "9", "10", "20", and "30" allow a player to position a marker within the region of the table 50 that includes only the numerals "1" through "36", exclusive of the numerals "20" and "30". No other two numeral dice combination produces results that are collectively defined by the same region of the table 50.

It is contemplated, and will be apparent to those skilled in the art from the foregoing specification, drawings, and examples that modifications and/or changes may be made in the embodiments of the invention. Accordingly, it is expressly intended that the foregoing are illustrative of preferred embodiments only, not limiting thereto, and that the true spirit and scope of the present invention be determined by reference to the appended claims.

What is claimed is:

1. An apparatus for playing a game, comprising:
   a board having a playing surface bounded by an elevated periphery defined by board indicia and an outer periphery adjacent outer limits of said board indicia;

said board indicia consisting of a plurality of unique regions in which each unique region is different from any other of said unique regions;

wherein said outer periphery defines a border which is elevated from said playing surface;

a plurality of subregions defined within each of said unique regions by said board indicia wherein each subregion is defined by a unique indicium;

a plurality of dice each having a plurality of faces;

dice indicia disposed on each of the faces of said dice capable of producing at least three unique arithmetic combinations of indicia from any two of the dice, each of the three unique arithmetic combinations corresponding to at least one of said unique indicium disposed on two or less of said unique regions of said board, each of said unique arithmetic combinations of indicia corresponding to two or less of said unique indicium; and a plurality of markers each having a same generic design adapted for placement on any of said board indicium corresponding to the arithmetic combinations of indicia from any two dice.

2. The apparatus of claim 1, wherein said board indicia comprises a table of numerals arranged two-dimensionally in rows and columns, each of said numerals being included in a unique one of the subregions.

3. The apparatus of claim 2, wherein said table of numerals comprises a multiplication table.

4. The apparatus of claim 2, wherein said table of numerals comprises an addition/subtraction table.

5. The apparatus of claim 1, wherein said plurality of dice comprises four dice with each of said dice having six faces.

6. The apparatus of claim 1, wherein said dice indicia comprise numerals.

7. The apparatus of claim 6, wherein said dice indicia further comprise mathematical functions.

8. An arithmetic game comprising:

a board having a playing surface bordered by an outer periphery adjacent outer limits of said playing surface;

wherein said outer periphery defines a border which is elevated from said playing surface;

said playing surface having inscribed thereon a table of numerals arranged in two-dimensional rows and columns;

a plurality of dice, including at least two dice having mathematical numerals inscribed thereon and at least one die having a mathematical function inscribed thereon, designed such that a range of mathematical results resulting from performing a function appearing on said plurality of dice after rolling of said plurality of dice by a player are included within a range of numerals inscribed on said playing surface of said board; and a plurality of markers for indicating numerals on said board resulting from performing a function appearing on said plurality of dice after rolling of said plurality of dice by a player.

9. The game of claim 8, wherein said table further comprises an upper right-hand quadrant of numerals, a lower right-hand quadrant of numerals, an upper left-hand quadrant of numerals, and a lower left-hand quadrant of numerals, said plurality of dice further comprising four dice, the indicia inscribed on two of said dice representing multiplicands and the indicia inscribed on two of said dice representing multipliers, wherein all mathematical results obtained from a multiplication of any multiplier inscribed on a multiplier dice with any multiplicand inscribed on a multiplicand dice results in a numeral which matches a numeral included in no more than two quadrants of numerals on the board.

10. The game of claim 8, wherein said plurality of dice further comprise four dice, the indicia inscribed on three of said plurality of dice representing numerals so that three of said plurality of dice are numbered dice, and the indicia inscribed on one of said plurality of dice representing the mathematical functions of addition and subtraction so that one of said plurality of dice is a function dice, wherein mathematical results obtained from addition or subtraction of numerals inscribed on two or more of said numbered dice results in a numeral that corresponds to a numeral inscribed on said board.

* * * * *